UNITED STATES PATENT OFFICE.

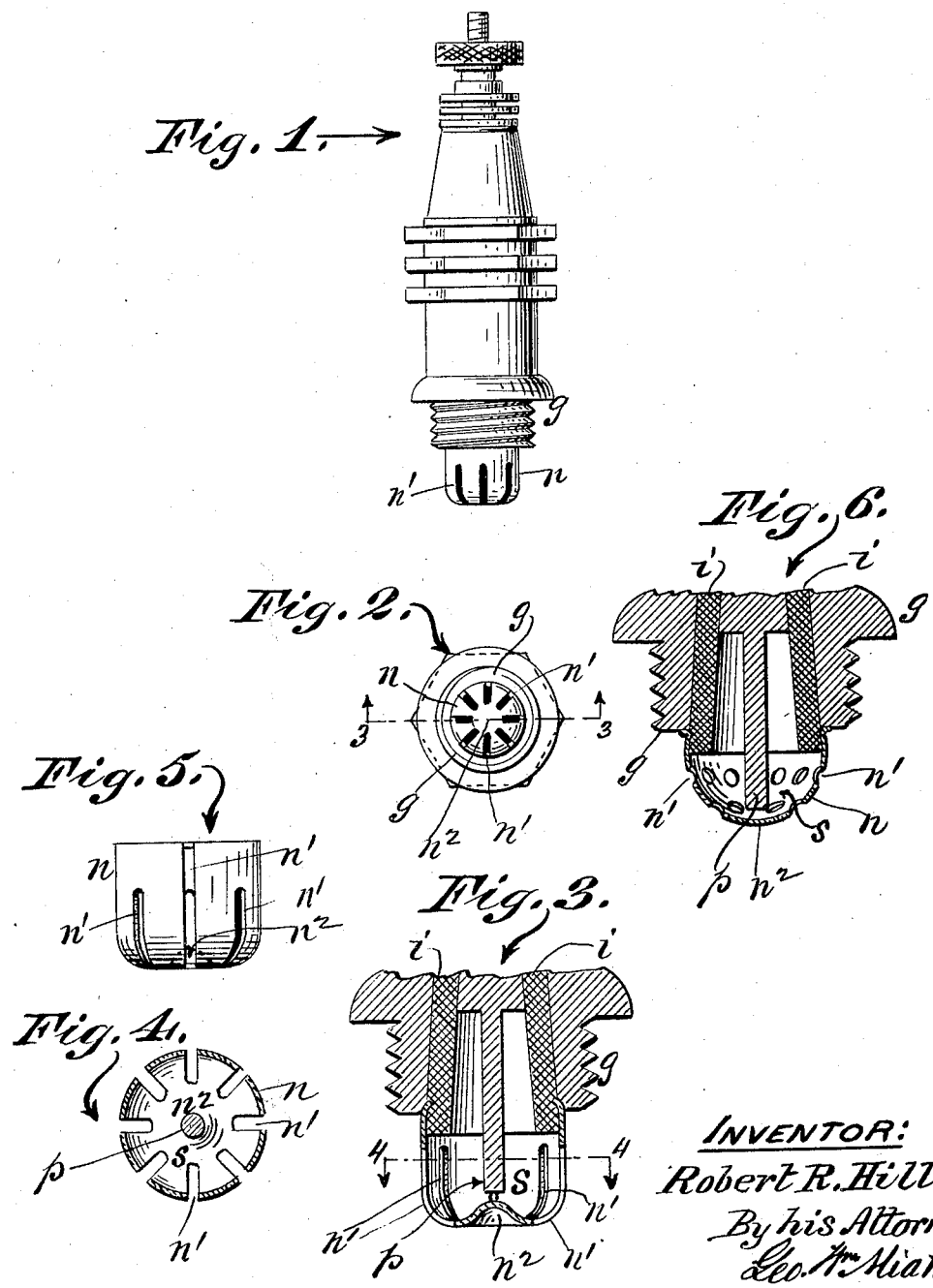

ROBERT R. HILL, OF VERONA, NEW JERSEY.

SPARK-PLUG.

1,360,294.     Specification of Letters Patent.     Patented Nov. 30, 1920.

Application filed March 21, 1919. Serial No. 284,002.

*To all whom it may concern:*

Be it known that I, ROBERT R. HILL, a citizen of the United States, and a resident of Verona, county of Essex, and State of New Jersey, have invented certain new and useful Improvements in Spark-Plugs, of which the following is a specification.

My invention relates to electric spark plugs for use in combustion engines, especially those of the type used on motors for automobiles and other land or marine vehicles. The object of my invention is to prevent the fouling of the electrodes by carbon accretions which are apt to occur by reason of direct contact with the hydro-carbon fuel, the imperfect combustion of the latter, and for other reasons well known in the art.

The invention consists essentially in making one of the electrodes in the form of a baffle or shield for the protection of the other electrode from direct impingement of the charges of hydro-carbon, at the same time creating an incipient ignition chamber between the two electrodes, the charge-firing explosion in which tends to blow off and keep clean the opposed surfaces of both electrodes,—at the same time subjecting the protecting or cap-electrode temporarily to a degree of heat high enough to produce incandescence for a period sufficient to insure the burning and reduction of any carbon residue resulting from imperfect combustion, all as hereinafter more fully set forth.

In the accompanying drawings,

Figure 1, is an elevation of a spark plug provided with one form of my cap electrode;

Fig. 2, is an inner end elevation thereof;

Fig. 3, is a section of the inner end of the spark plug upon an enlarged scale for clearness of illustration, and taken upon plane of line 3—3, Fig. 2;

Fig. 4, is a transverse section taken upon plane of line 4—4, Fig. 3;

Fig. 5, is an elevation of the cap electrode shown in the preceding figures; and Fig. 6, is a view like unto Fig. 3, showing a modification of the cap electrode.

It is well known in the art that the main difficulty with electric spark plugs is the fouling of the terminals or electrodes by deposits of carbon derived from the hydrocarbon fuel used in combustion engines, rendering their cleaning or replacement imperative after comparatively short periods of use. In other words, the life and utility of a spark plug used to effect the explosion of hydrocarbon in a combustion motor is limited by such accretions of carbon on and between the sparking poles.

I obviate this difficulty by making one of the electrodes, preferably the ground or negative electrode $n$, in the form of a cap adapted to fit over, inclose, and shield the other, or central positive or high tension electrode $p$, substantially as shown in the drawings,— said cap-electrode $n$, being formed with openings $n'$, of an aggregate area adapted to admit sufficient hydrocarbon vapor into the inclosed space $s$, to provide for an incipient explosion therein when the spark passes between the electrodes $p$, $n$, while at the same time the main surface of said cap-electrode $n$, is sufficient in extent to shield the central positive electrode $p$, from the direct impact of the hydrocarbon charge.

The cap electrode $n$, is made of relatively thin nickle alloy or equivalent metallic substance that will not fuse or burn even when incandescent, as when rendered temporarily so by the heat generated both by the incipient or charge-firing ignition within the electrode chamber $s$, and by the combustion of the main charge of hydrocarbon in the power cylinder of the motor.

It is obvious that the openings $n'$, in the cap-electrode $n$, may be of various forms without departing from the spirit of my invention, and with like results, so that I do not limit myself in this respect. Thus, in the first four figures of the accompanying drawings I show the openings $n'$, as made in the form of radiant slots, while in Fig. 6, round or oblong openings are adapted to perform a like function in providing for restricted communication with the incipient ignition chamber or space $s$.

Also, it is obvious that the cap-electrode $n$, being preferably made in the form of an attachment, may be affixed to the spark plug in contactual and electrical engagement with the ground, or shell $g$, in various ways with like result. Thus, in Fig. 3, the inturned edges of the cap-electrode $n$, are shown as pressed into a groove formed between the shell $g$, and the insulating sleeve $i$, in which case one of the slots $n'$, may be extended to and through the said inner edge of the cap as shown in Fig. 5, to afford the necessary elasticity and resilience; whereas in Fig. 6, the edges of the said cap-electrode $n'$, are out-turned to contact with the shell $g$, and the adjacent portion of the cap $n$, is pressed or indented into the opposed surface of the insulating sleeve $i$.

Furthermore, the cap-electrode may obviously be varied in configuration with like results, it being preferable however to have the central portion $n^2$, opposed to the positive electrode $p$, solid, for the better protection of said electrode $p$, against the impingement of hydrocarbon; and in this connection it may be stated that if the said central portion $n^2$, of the cap $n$, is inturned toward the opposed end of said central electrode $p$, as in Fig. 3, sparking, and the elimination of carbon, will be facilitated.

The incipient or initial explosion within the ignition chamber $s$, on the passage of the spark between the electrodes $p$, $n$, results in a blow-off or exit puff which tends to eject therefrom any carbon that might otherwise collect upon or between said electric poles; while the cap-electrode $n$, (especially the central portion thereof $n^2$) shields the said positive electrode $p$, from the direct impingement thereon of the charges of hydrocarbon used for fuel.

What I claim as my invention and desire to secure by Letters Patent is:

1. A spark plug comprising a shell, an electrode therein, and an electrode in the form of a shield inclosing the first-named electrode and provided at its outer end with elongated openings, one of which is extended through the inner edge of the shield to afford resiliency thereto, the inner edge of the shield being frictionally detachably held to said shell and embracing the same throughout its annular extent, the central end portion of said shield opposite the end of the first-named electrode being solid and indented toward the latter.

2. A spark plug comprising an insulating sleeve, a shell, and a cap electrode of thin material having elongated slots with its upper end embedded in the said sleeve and engaged by said shell.

3. A spark plug comprising an insulating sleeve, a shell, with a groove formed between said shell and sleeve, and a cap electrode having elongated slots and having its upper edge pressed into said groove and covered by the end of said shell.

ROBERT R. HILL.

Witnesses:
    DOROTHY MIATT,
    GEO. WM. MIATT.